United States Patent [19]
Robertson et al.

[11] Patent Number: 5,893,001
[45] Date of Patent: Apr. 6, 1999

[54] FILM CASSETTE

[75] Inventors: Jeffrey C. Robertson, Rochester; Mark D. Fraser, Hamlin; Daniel M. Pagano, Honeoye Falls; John J. Breen, Southborough, all of N.Y.

[73] Assignee: Eastman Kodak Company, Rochester, N.Y.

[21] Appl. No.: 744,784

[22] Filed: Nov. 6, 1996

[51] Int. Cl.⁶ .................................................. G03B 17/76
[52] U.S. Cl. .......................................... 396/516; 242/348
[58] Field of Search .................................. 396/512, 513, 396/514, 515, 516; 242/348, 348.1, 348.2, 348.3, 348.4

[56] References Cited

U.S. PATENT DOCUMENTS

| 446,373 | 2/1891 | Whitney. | |
|---|---|---|---|
| 1,527,476 | 2/1925 | Gianetto. | |
| 3,037,719 | 6/1962 | Bemmann | 242/71.1 |
| 3,143,050 | 8/1964 | Winkler et al. | 95/31 |
| 4,779,110 | 10/1988 | Stella | 354/88 |
| 5,265,821 | 11/1993 | Takatori | 396/514 X |
| 5,522,563 | 6/1996 | Earnhart et al. | 242/348 |
| 5,570,152 | 10/1996 | Kaya | 396/515 |

*Primary Examiner*—Howard B. Blankenship
*Attorney, Agent, or Firm*—Peyton C. Watkins

[57] ABSTRACT

A film cassette having perforated film for permitting automated extension of the film, the film cassette comprises a core having the film convolutedly wound on the core. A rotatable drum receives the core, and includes a recessed slot and a projection which engages a perforation of the film for permitting motion of the film as the drum is rotated. A shell receives the drum, and includes an opening and a finger that matingly engages the recessed slot of the drum for forcing the film through the opening of the shell and, consequently, out of the film cassette.

28 Claims, 7 Drawing Sheets

FILM CASSETTE

CROSS-REFERENCE TO RELATED APPLICATIONS

The present application is related to U.S. application Ser. No. 08/744,776, filed Nov. 6, 1996, by Jeffrey Robertson, et al, and entitled, A CAMERA BACK FOR MEDIUM FORMAT CAMERAS.

FIELD OF THE INVENTION

The invention relates generally to the field of photography and, more particularly, to a film cassette containing roll film.

BACKGROUND OF THE INVENTION

In cassettes of conventional 35 mm film, such as manufactured by Eastman Kodak Company and Fuji Film Company, Ltd., the filmstrip is wound on a flanged spool which is rotatably supported within a cylindrical shell. A leading end section of the filmstrip, commonly referred to as a "film leader," protrudes from a light-trapped slit or mouth of a cassette shell. One end of the spool has a short axial extension which projects from the shell, enabling the spool to be turned by hand. If the spool is initially rotated in an unwinding direction, the film roll inside the shell will tend to expand radially since the inner edge of the filmstrip is attached to the spool, and the fogged leader section protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

In the advanced photo system, the filmstrip is also wound on a flanged spool. A lip portion extends axially and inwardly around the periphery of the each flange for providing a surface against which the film rests for containing it within the spool. The film is initially disposed entirely on the spool, and the cassette contains a light-tight slit through which the film eventually passes upon unwinding. The lip portion of each retaining piece is slightly deflected adjacent the light-tight opening for permitting the film to exit through the light-tight opening.

For unwinding the film to permit image capture, a cassette containing the spool is inserted into a camera and the spool is rotated, which obviously causes the film to rotate substantially simultaneously therewith. The leading edge of the film is then directed through the tight-tight opening.

Although the presently utilized methods and apparatuses for unwinding the film are without drawbacks, an alternative cassette configuration with fewer components is always desirable.

Consequently, a need exists for providing another film cassette configuration having automated film extension, while providing for construction from fewer components.

SUMMARY OF THE INVENTION

The present invention is directed to overcoming one or more of the problems set forth above. Briefly summarized, according to one aspect of the present invention, the invention resides in a film cassette having perforated film for permitting automated extension of the film, the film cassette comprising: (a) a core having the film convolutedly wound on said core; (b) a rotatable drum that receives said core, and that includes a recessed slot and a projection which engages a perforation of the film for causing movement of the film as said drum is rotated; and (c) a shell that receives said drum, and that includes both an opening and a finger that matingly engages the recessed slot of said drum for forcing the film through the opening of the said shell and, consequently, out of the film cassette.

It is an object of the present invention to provide a film cassette having film therein which is automatically extended.

It is also an object of the present invention to provide a film cassette which provides integrity of motion of the film during the extension process.

It is an advantage of the present invention to provide a film cassette which is cost efficient to manufacture.

It is a feature of the present invention to provide a rotatable drum that receives a core, and that includes a recessed slot and a projection which engages a perforation of the film for permitting motion of the film as the drum is rotated.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
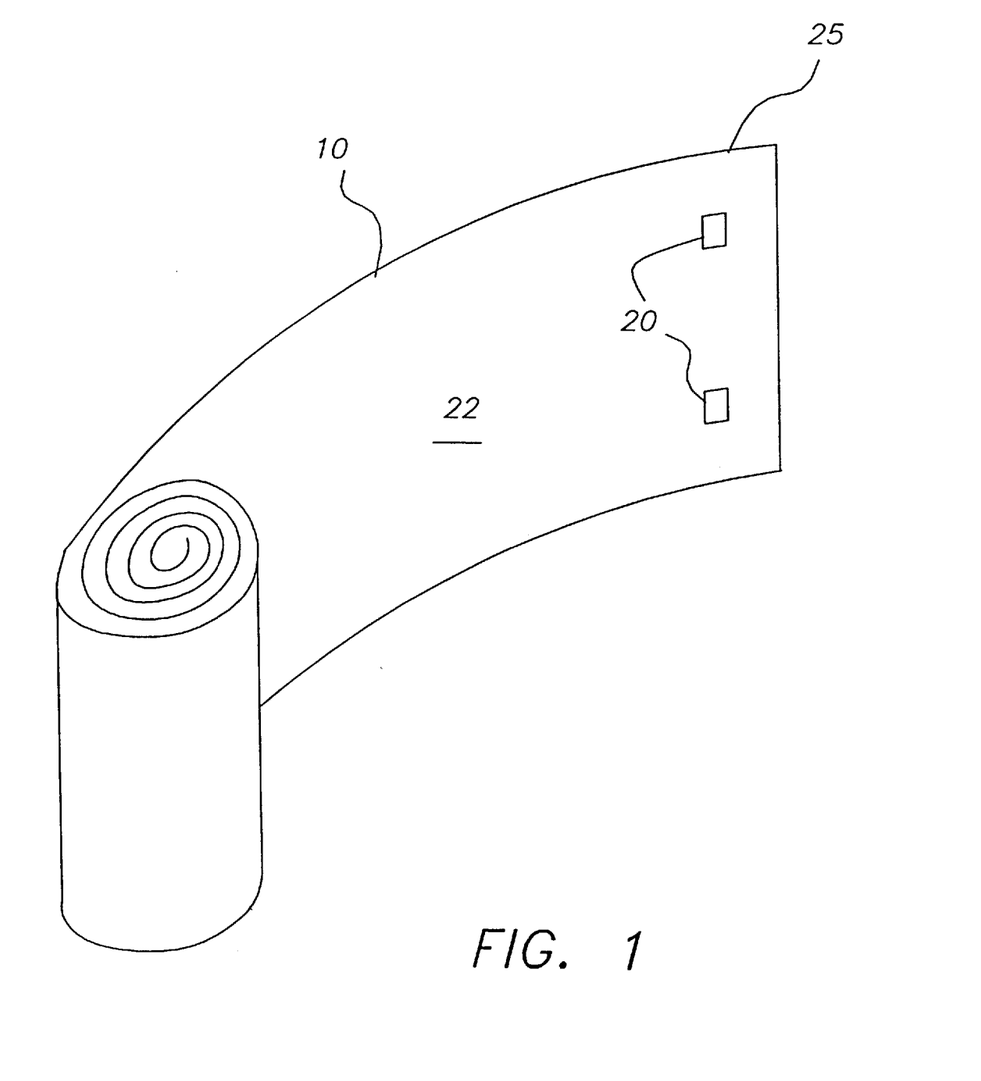
FIG. 1 is a perspective view of film which may be utilized in a film cassette of the present invention.

Referring to FIG. 1, there is illustrated film 10 which may utilized in a film cassette (shown in FIG. 6) of the present invention. The film 10 includes a plurality of perforations 20 adjacent the leading edge 25 for causing movement of the film 10 from the cassette, as will be described below in detail. The perforations 20 are mated in a pair so that they may be engaged by a pair of projections of the film cassette, also described in detail below. The portion of the film 10 between the leading edge 25 and the perforations 20 is hereinafter referred to as leader 22.

Figures 2A, 2B:
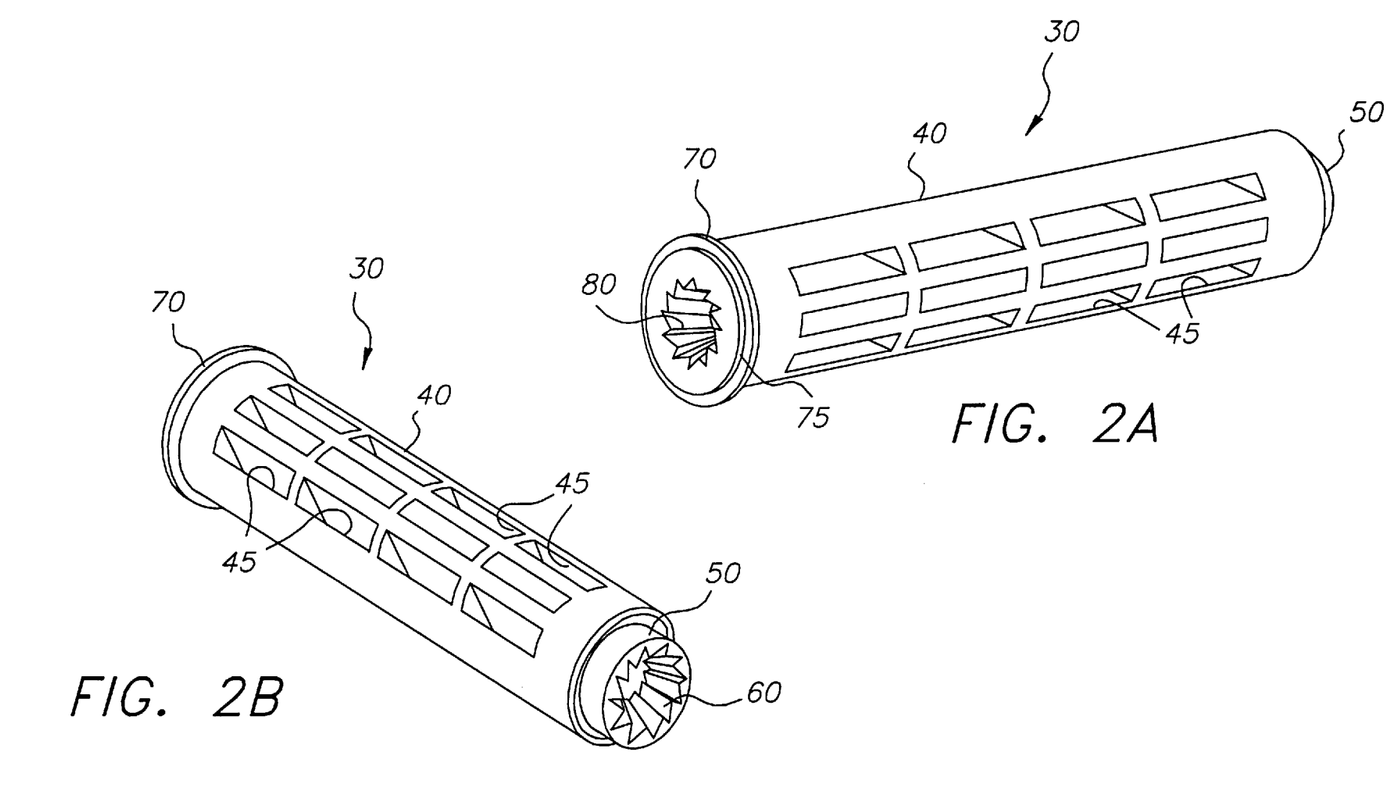
FIG. 2A is a perspective view of a core of the film cassette of the present invention.
FIG. 2B is another perspective view of the core of FIG. 2A.

Referring to FIGS. 2A and 2B, there is illustrated a core 30 of a film cassette of the present invention. The core 30 includes a cylindrical, substantially solid barrel 40 having a plurality of cored-out portions 45 thereon for enabling efficient manufacture of the core 40, as will be recognized by those skilled in the art. An end plug extends 50 axially and outwardly from one end of the barrel 40, and includes a saw-toothed shaped, recessed opening 60 for receiving a first rotational device of a camera (not shown). The other end of the barrel 40 includes a flanged portion 70 with an axially extending lip portion 75 having a saw-toothed shaped, recessed opening 80 for also receiving the first rotational device of the camera. Initially, the film (not shown in FIGS. 2A and 2B for clarity) is convolutedly wound on the core 30 for providing a medium for capturing images thereon.

Figure 3A:
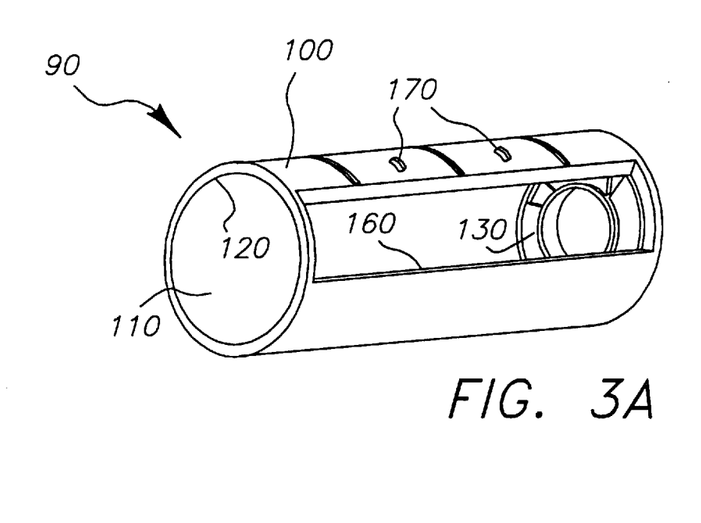
FIG. 3A is a perspective view of a drum of the film cassette of the present invention.
Figure 3B:
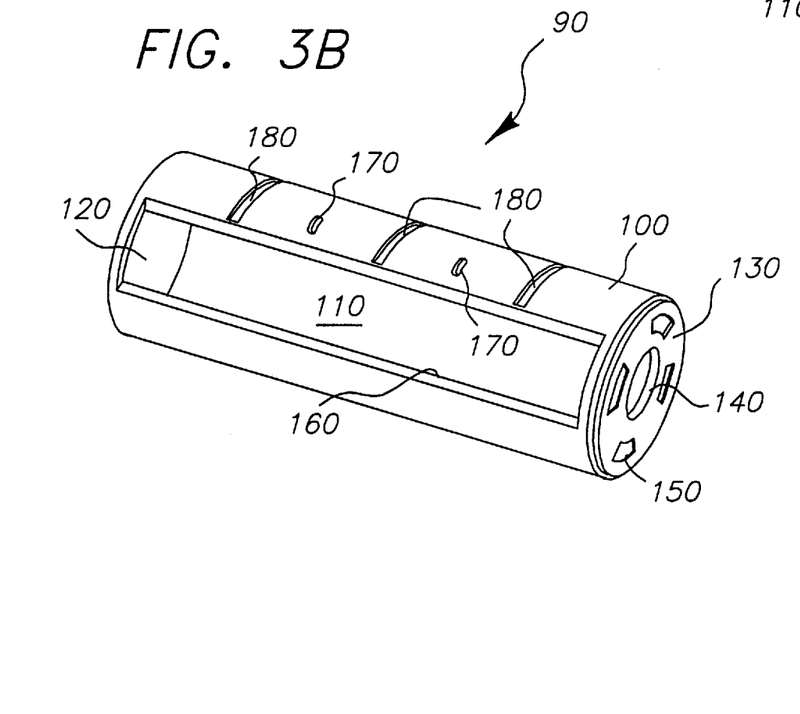
FIG. 3B is another perspective view of the drum of FIG. 3A.

Referring to FIGS. 3A and 3B, there is illustrated a drum 90 of the film cassette of the present invention. The drum 90 includes a cylindrical, annular-shaped body 100 having a hollowed-out interior 110 for receiving the core 30 therein. One end of the drum 90 includes an open portion 120 for permitting an unobstructed entrance of the core 30 into the interior of the drum 90, and the other end includes a cap 130 for maintaining the core 30 within the drum 90. An opening 140 is disposed in the center of the cap 130 for matingly receiving the end plug 50 therein. The cap 130 includes four indentations 150 which receive a second rotational device of the camera for permitting drum 90 to be rotated.

The drum 90 further includes a cut-away portion 160 for permitting the film 10 to pass therethrough, and includes a pair of projections 170 which respectively engage a pair of perforations 20 in the film 10. Although one projection, or more than two projections, may be used, the preferred embodiment illustrates a pair. Three recessed slots 180 are disposed on the outer surface of the drum 90 for engaging fingers of a shell of the cassette, both of which are described in detail below. The recessed slots 180 are preferably disposed one hundred eighty degrees around the circumference of the drum 90 for permitting rotation of the drum 90 approximately one hundred eighty degrees.

Figures 4A, 4B:
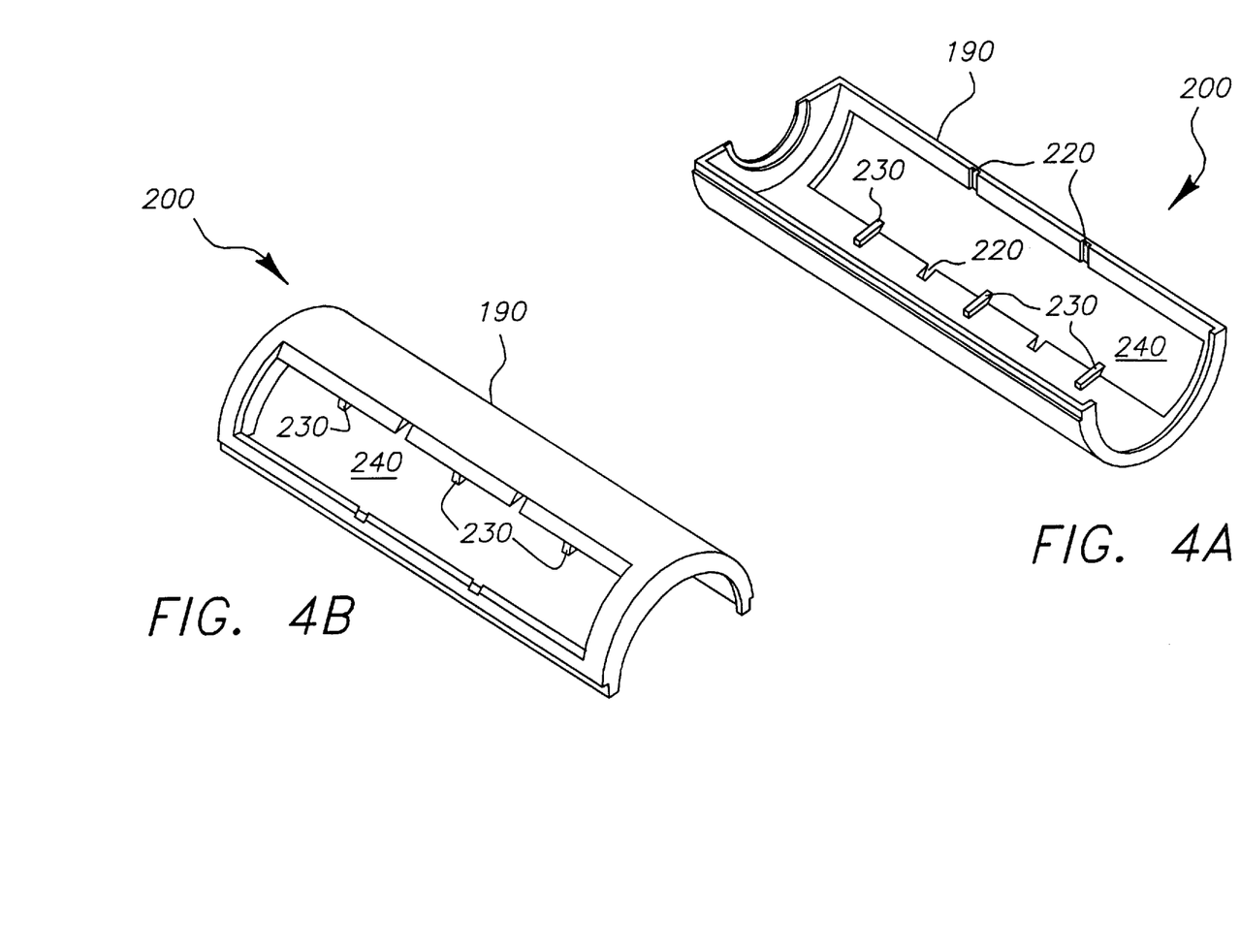
FIG. 4A is a perspective view of a first portion of a shell of the film cassette of the present invention.
FIG. 4B is another perspective view of the first portion of the shell of FIG. 4A.
Figures 5A, 5B:
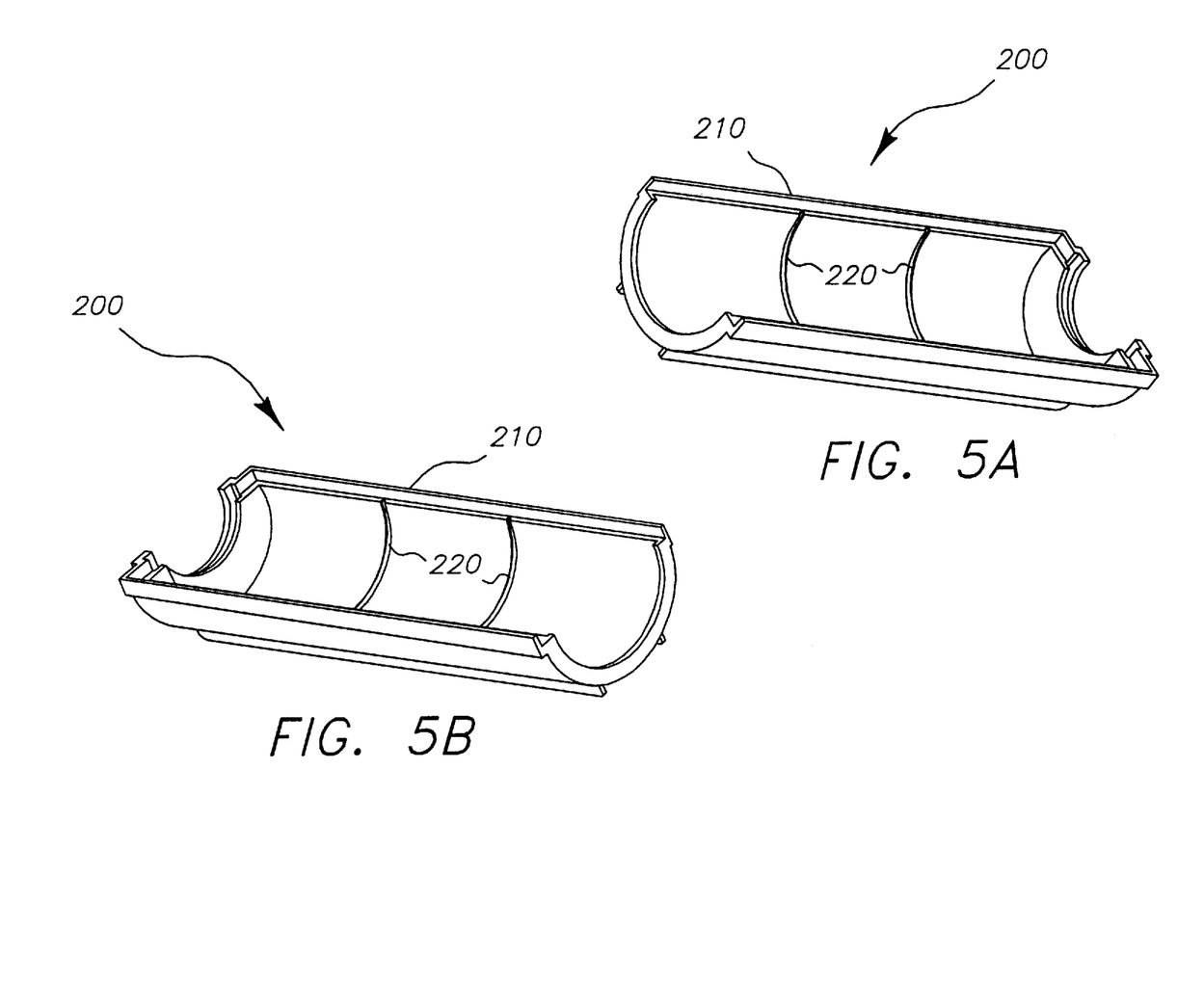
FIG. 5A is perspective view of a second portion of the shell of the film cassette of the present invention.
FIG. 5B is another perspective view of the second portion of FIG. 5A.

Referring to FIGS. 4A and 4B, there is illustrated a first side portion 190 of a mated pair of sides of a shell 200 of the present invention. Referring to FIGS. 5A and 5B, there is illustrated a second side portion 210 of the shell 200 which, when mated together with the first side portion 190, function to enclose both the core 30 and drum 90. Interior surfaces of the first side portion 190 and the second side portion 210 include two recessed grooves 220 which are respectively aligned with the projections 170 of the drum 90 for permitting each groove 220 to receive a projection 170. The circumferential distance of each recessed groove 220 is sufficient to permit rotation of the drum 90 throughout one hundred eighty degrees within the shell 200. The first side portion 190 of the shell 200 also includes three extensions 230 on its interior surface adjacent an opening 240, which extensions 230 respectively align with the three recessed slots 180 on the drum 90 and which function as barriers for forcing the film 10 upwardly through the opening 240 and, consequently, out of the film cassette.

Figure 6:
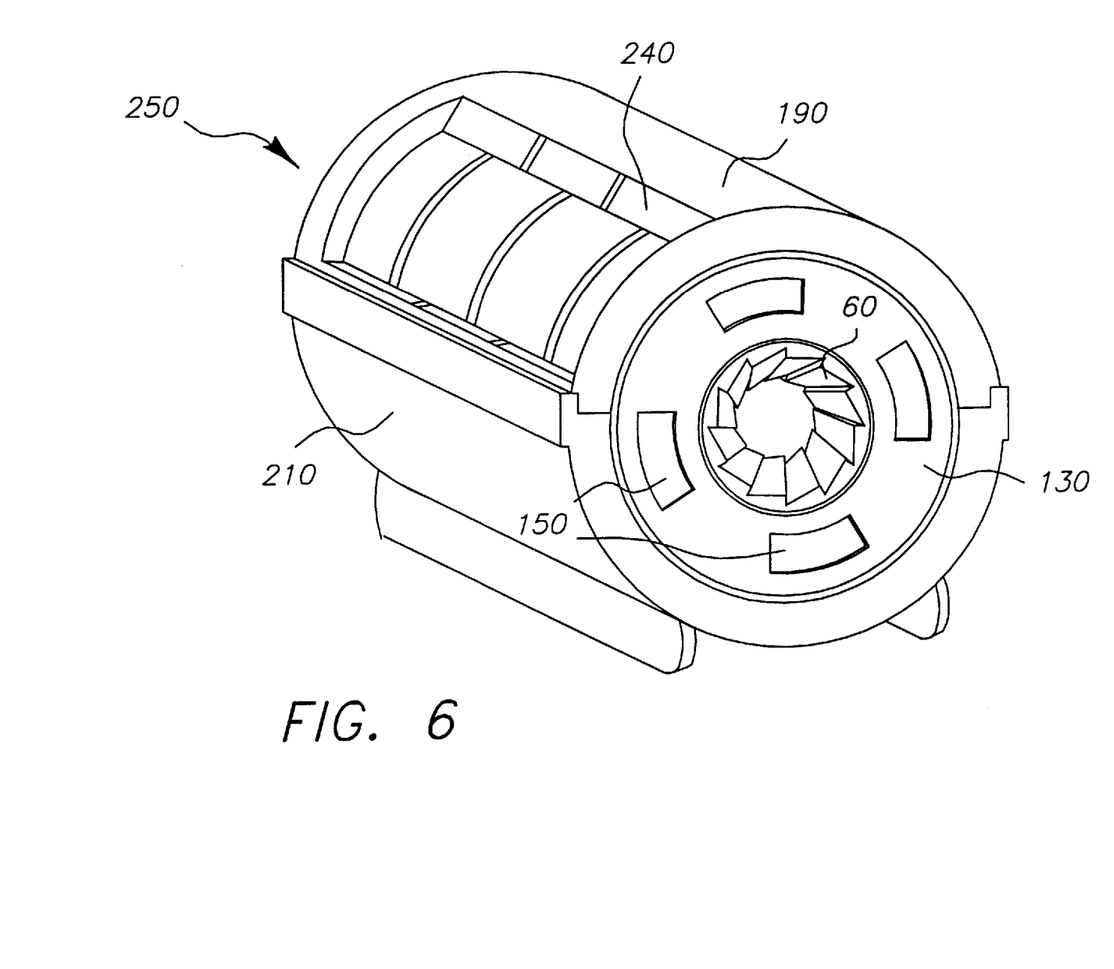
FIG. 6 is a perspective view of the assembled film cassette of the present invention as manufactured (prior to extending the film out of the cassette)

Referring to FIG. 6, there is illustrated a perspective view of the film cassette 250 as received by the consumer. The majority of film 10 is wound on the core 30 within the drum 90. The other portion of the film 10 extends through the cut-away portion 160 of drum 90 with the perforations 20 engaged upon the projections 170 and the leader 22 overlaying the annular-shaped body 100 of drum 90. The above-described sub-assembly in this paragraph is then enclosed within a shell 200 with the cut-away portion 160 oriented diametrically opposite opening 240. In this orientation, no film is exposed to or visible from the exterior, and the cassette is light tight.

Figure 7:
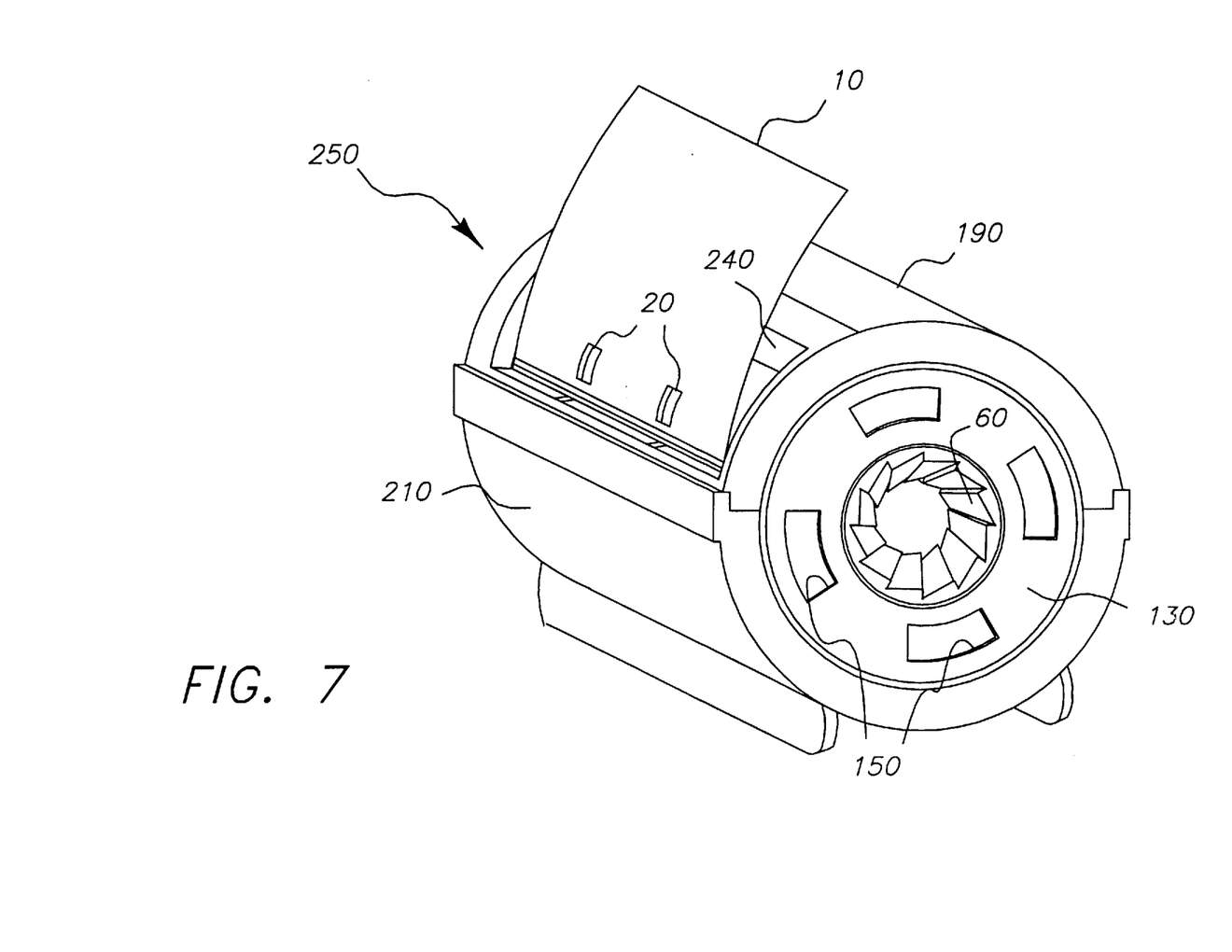
FIG. 7 is a perspective view of the assembled film cassette of the present invention with the film extended out of the cassette.

Referring to FIG. 7, there is illustrated a perspective view of the film cassette 250 with all of the above-mentioned parts (core, barrel and shell) assembled together and actuated to extend the film 10. To extend the film 10, the first rotational device of the camera engages either recessed, saw-toothed portions 60 or 80 of core 30, and the second rotational device of the camera engages the indentations 150 of drum 90. The first and second rotational devices simultaneously rotate both the core 30 and drum 90. The leading edge 25 of the film 10 is advanced through the opening 240 of the shell 200. It is instructive to again note that engagement of perforations 20 with projections 170 ensure that the leader 22 is advanced by rotation of drum 90 through the opening 240 of the shell 200. The leading edge 25 of the film 10 is forced through opening 240 of shell 200 by the extensions 230. Consequently, a portion of the leader 22 of the film 10 is exposed so that a latching device (not shown) of the camera can grasp it for further unwinding the film 10.

Rotation of the drum 90 continues until it is rotated approximately one hundred eighty degrees leaving the cut-away portion 160 of the drum 90 aligned with opening 240 of shell 200 to permit further withdrawal of the film by the camera. It is instructive to note that the angular orientation and circumferential extent of either the recessed slots 180 of drum 90 or the recessed grooves 220 of shell 200 can be used to restrict rotation of drum 90 within the shell 200 such that the cut-away portion 160 and opening 240 are properly aligned for withdrawal or rewinding of the film at one extent of permissible drum rotation, or positioned diametrically opposite each other to render the film cassette 250 light tight at the opposite extent of drum rotation.

Thereafter, the camera directs the film 10 to its proper position for image capture; such camera portions as the directing and grasping mechanisms are well known in the art, such as those in the advance photo system, and are not described herein.

The invention has been described with reference to a preferred embodiment. However, it will be appreciated that variations and modifications can be effected by a person of ordinary skill in the art without departing from the scope of the invention.

PARTS LIST:

10 film
20 perforations
22 leader
25 leading edge
30 core
40 solid barrel
45 cord-out portion
50 end plug
60 saw-toothed recessed opening
70 flanged portion
75 lip portion
80 saw-toothed recessed opening
90 drum
100 annular-shaped body
110 hollowed-out interior 120 open portion
130 cap
140 opening
150 indentations
160 cut-away portion
170 projections
180 recessed slots
190 first side portion
200 shell
210 second side portion
220 recessed grooves
230 three extensions
240 opening
250 film cassette

We claim:

1. A film cassette having perforated film for permitting automated extension of the film, the film cassette comprising:

(a) a core having the film convolutedly wound on said core;

(b) a rotatable drum that receives said core, and that includes a recessed slot and a projection which engages a perforation of the film for causing movement of the film as said drum is rotated; and (c) a shell that receives said drum, and that includes an opening and a finger that matingly engages the recessed slot of said drum for forcing the film through the opening of the said shell and, consequently, out of the film cassette.

2. The film cassette as in claim 1, wherein said shell includes a recessed groove for receiving the projection of said drum, and wherein the projection of said drum is disposed radially toward said shell so that the projection extends entirely through the perforation and, consequently, the film and engages the recessed groove for maintaining integrity of the motion of the film as the drum is rotated.

3. The film cassette as in claim 1, wherein said finger extends radially toward said drum and into the recessed slot for forcing the film through the opening of said shell.

4. The film cassette as in claim 3, wherein said drum includes a cut-away portion that receives the film from said core for permitting the film to engage the projection.

5. The film cassette as in claim 4, wherein the recessed slot of said drum extends circumferentially on an outer surface of said drum.

6. The film cassette as in claim 1, wherein said core is rotatable substantially simultaneously with the rotation of said drum for permitting extension of the film.

7. The film cassette as in claim 1, wherein said shell includes a plurality of fingers, and wherein said drum includes a plurality of recessed slots for respectively receiving the plurality of fingers.

8. The film cassette as in claim 1, wherein the film includes a plurality of perforations, and wherein said drum includes a plurality of projections for respectively engaging the plurality of perforations.

9. A film cassette having film for permitting automated extension of the film, the film cassette comprising:

(a) a core having the film convolutedly wound on said core;

(b) a rotatable drum that receives said core and that includes a recessed slot; and (c) a shell that receives said drum and that includes a finger that matingly engages the recessed slot of said drum for forcing the film out of said shell and, consequently, out of the film cassette.

10. The film cassette as in claim 9, wherein said finger extends radially toward said drum and into the recessed slot for forcing the film through the opening of said shell.

11. The film cassette as in claim 9, wherein said shell includes an opening through which the film passes for permitting the film to exit the film cassette.

12. The film cassette as in claim 11, wherein the recessed slot of said drum extends circumferentially on an outer surface of said drum.

13. The film cassette as in claim 11, wherein said core is rotatable substantially simultaneously with the rotation of said drum for permitting extension of the film.

14. The film cassette as in claim 11, wherein said shell includes a plurality of fingers, and wherein said drum includes a plurality of recessed slots for respectively receiving the plurality of fingers.

15. A film cassette having perforated film for permitting automated extension of the film, the film cassette comprising:

(a) a core having the film convolutedly wound on said core;

(b) a rotatable drum that receives said core and that includes a projection which engages a perforation of the film for causing movement of the film as said drum is rotated; and (c) a shell that receives said drum and that includes an opening that receives the film from said drum for ultimately passing the film out of the film cassette.

16. The film cassette as in claim 15, wherein said shell includes a recessed groove for receiving the projection of said drum, and wherein the projection of said drum is disposed radially toward said shell so that the projection extends entirely through the perforation and, consequently, the film and engages the recessed groove for maintaining integrity of the motion of the film as the drum is rotated.

17. The film cassette as in claim 16, wherein said drum includes a cut-away portion that receives the film from said core for permitting the film to engage the projection.

18. The film cassette as in claim 15, wherein the film includes a plurality of perforations, and wherein said drum includes a plurality of projections for respectively engaging the plurality of perforations.

19. A method for permitting automated extension of film, the method comprising the steps of:

(a) convolutedly winding the film on a core;

(b) inserting the core into a drum that includes a recessed slot and a projection which engages a perforation of the film for causing movement of the film as said drum is rotated;

(c) inserting the drum into a shell which includes an opening and a finger that matingly engages the recessed slot of said drum for forcing the film through the opening of said shell and, consequently, out of the film cassette.

20. The method as in claim 19 further comprising the step of inserting a recessed groove into the shell for receiving the projection of said drum.

21. The method as in claim 19 further comprising the step of extending the finger radially toward the drum and into the recessed slot for forcing the film through the opening of said shell.

22. The method as in claim 21 further comprising the step of inserting a cut-away portion into the drum for receiving the film from the core for permitting the film to engage the projection.

23. A method for permitting automated extension of perforated film, the method comprising the steps of:

(a) convolutedly winding film on a core;

(b) inserting the core into a drum that includes a recessed slot; and (c) inserting the drum into a shell having a finger that matingly engages the recessed slot of the drum for forcing the film out of the shell and, consequently, put of the film cassette.

24. The method as in claim 23 further comprising the step of radially extending the finger toward the drum and into the recessed slot for forcing the film through the opening of the shell.

25. The method as in claim 23 further comprising the step of substantially simultaneously rotating the core and drum for permitting extension of the film.

26. A method for permitting automated extension of perforated film, the method comprising the steps of:

(a) providing a core having film convolutedly wound on the core;

(b) inserting the core into a drum that includes a projection which engages a perforation of the film for causing movement of the film as the drum is rotated; and (c) inserting the drum into a shell that includes an opening for receiving the film from the drum for ultimately passing the film out of the film cassette.

27. The method as in claim 26 further comprising the step of inserting a cut-away portion into the drum for receiving the film from the core for permitting the film to engage the projection.

28. The method as in claim 27 further comprising the step of providing a plurality of perforations and a plurality of projections that respectively engage each other.

* * * * *